(12) United States Patent
Phillips et al.

(10) Patent No.: US 10,974,353 B2
(45) Date of Patent: Apr. 13, 2021

(54) METHOD OF FORMING A COMPONENT FOR A HEAT EXCHANGER

(71) Applicant: HS Marston Aerospace Limited, Wolverhamptom (GB)

(72) Inventors: Paul Phillips, Bromsgrove (GB); Neil Basini, Wolverhampton (GB)

(73) Assignee: HS MARSTON AEROSPACE LIMITED, Wolverhampton (GB)

( * ) Notice: Subject to any disclaimer, the term of this patent is extended or adjusted under 35 U.S.C. 154(b) by 0 days.

(21) Appl. No.: 16/014,081

(22) Filed: Jun. 21, 2018

(65) Prior Publication Data
US 2018/0369972 A1    Dec. 27, 2018

(30) Foreign Application Priority Data

Jun. 22, 2017 (EP) .................................. 17177513

(51) Int. Cl.
| | |
|---|---|
| *B23P 15/26* | (2006.01) |
| *F28F 3/02* | (2006.01) |
| *F28F 3/00* | (2006.01) |
| *F28F 3/08* | (2006.01) |
| *B21D 53/04* | (2006.01) |
| *F28D 9/00* | (2006.01) |

(52) U.S. Cl.
CPC .............. *B23P 15/26* (2013.01); *F28D 9/00* (2013.01); *F28D 9/0075* (2013.01); *F28F 3/005* (2013.01); *F28F 3/022* (2013.01); *F28F 3/08* (2013.01); *B21D 53/04* (2013.01); *F28F 2255/12* (2013.01)

(58) Field of Classification Search
CPC ......... B21D 53/02; B21D 53/04; B23P 15/26; F28F 3/08; F28F 3/005; F28F 3/022; F28F 2255/12; F28D 9/0075; F28D 9/00; Y10T 29/49995; Y10T 29/49996; Y10T 29/53113
USPC ......................................... 29/726, 557, 558
See application file for complete search history.

(56) References Cited

U.S. PATENT DOCUMENTS

| | | | | |
|---|---|---|---|---|
| 2,300,350 A | * | 10/1942 | Del Camp | H01R 33/7628 439/379 |
| 4,133,227 A | * | 1/1979 | Crowe | B21D 37/20 29/445 |
| 4,277,988 A | * | 7/1981 | Crowe | B21D 37/20 29/558 |
| 5,726,495 A | * | 3/1998 | Aihara | H01L 21/4878 165/80.3 |

(Continued)

FOREIGN PATENT DOCUMENTS

| | | |
|---|---|---|
| GB | 2348481 A | 10/2000 |
| GB | 2524059 A | 9/2015 |
| GB | 2539915 A | 1/2017 |

OTHER PUBLICATIONS

Extended European Search Report for International Application No. 17177513.3 dated Dec. 22, 2017, 7 pages.

*Primary Examiner* — Sarang Afzali
*Assistant Examiner* — Darrell C Ford
(74) *Attorney, Agent, or Firm* — Cantor Colburn LLP

(57) ABSTRACT

A method of forming a component for a heat exchanger is disclosed. The method comprises machining a portion of a metal sheet to form a plurality of protrusions, and forming apertures in the portion of the metal sheet so as to form a plurality of ribs defined by adjacent ones of the apertures, wherein at least one protrusion is located on each of said ribs.

13 Claims, 5 Drawing Sheets

(56) References Cited

U.S. PATENT DOCUMENTS

| | | | | |
|---|---|---|---|---|
| 5,926,938 A * | 7/1999 | Jarek | ................... | B24B 1/00 |
| | | | | 269/8 |
| 5,937,517 A * | 8/1999 | Smith | ................... | B23P 15/26 |
| | | | | 257/E23.102 |
| 6,317,960 B1 * | 11/2001 | Kragle | ................. | B23P 15/243 |
| | | | | 29/558 |
| 6,401,804 B1 * | 6/2002 | Shimoya | .............. | F28D 1/0333 |
| | | | | 165/133 |
| 7,836,597 B2 * | 11/2010 | Datta | ................. | F28D 15/0266 |
| | | | | 29/890.041 |
| 8,726,976 B2 | 5/2014 | Schrader et al. | | |
| 9,550,349 B1 | 1/2017 | Larsen et al. | | |
| 10,792,726 B2 * | 10/2020 | Phillips | ................. | B21D 53/04 |
| 2001/0029767 A1 * | 10/2001 | Adams | ................. | B21D 13/02 |
| | | | | 72/326 |
| 2002/0071797 A1 * | 6/2002 | Loffler | ................ | B01J 37/0248 |
| | | | | 422/600 |
| 2003/0152488 A1 * | 8/2003 | Tonkovich | ........... | B01F 5/0604 |
| | | | | 422/400 |
| 2004/0175541 A1 * | 9/2004 | Smeenk | ................ | B23P 15/246 |
| | | | | 428/141 |
| 2004/0200607 A1 * | 10/2004 | Rehberg | ................. | F28D 9/005 |
| | | | | 165/167 |
| 2005/0200001 A1 * | 9/2005 | Joshi | ........................ | F28F 3/08 |
| | | | | 257/712 |
| 2005/0284621 A1 * | 12/2005 | Katoh | ................. | F28D 1/05391 |
| | | | | 165/174 |
| 2007/0225532 A1 * | 9/2007 | Tonkovich | ........... | B01F 5/0475 |
| | | | | 585/444 |
| 2007/0246202 A1 * | 10/2007 | Yu | ......................... | B21D 53/02 |
| | | | | 165/152 |
| 2009/0032232 A1 * | 2/2009 | Murayama | ............ | F28D 9/0037 |
| | | | | 165/167 |
| 2011/0056669 A1 | 3/2011 | Pruett | | |
| 2012/0312778 A1 * | 12/2012 | Ullrich, Jr. | .............. | C23C 14/34 |
| | | | | 216/41 |
| 2013/0056186 A1 * | 3/2013 | Schalansky | ............. | F28F 3/086 |
| | | | | 165/137 |
| 2013/0133346 A1 * | 5/2013 | Garimella | ............... | F25B 15/02 |
| | | | | 62/101 |
| 2014/0231055 A1 * | 8/2014 | Schalansky | ............. | F28F 3/086 |
| | | | | 165/166 |
| 2014/0352934 A1 * | 12/2014 | Barone | ................... | B23P 15/26 |
| | | | | 165/166 |
| 2015/0027669 A1 * | 1/2015 | Kokas | ..................... | F28D 15/04 |
| | | | | 165/104.26 |
| 2017/0003081 A1 | 1/2017 | Hill et al. | | |
| 2019/0029106 A1 * | 1/2019 | Lin | ..................... | H01L 23/3736 |
| 2019/0368823 A1 * | 12/2019 | Chan | ....................... | F28D 15/04 |
| 2020/0271387 A1 * | 8/2020 | Eldred | ................... | F28D 9/0012 |
| 2020/0278158 A1 * | 9/2020 | Nilsson | ..................... | F28F 3/08 |
| 2020/0284521 A1 * | 9/2020 | Gadalla | ..................... | F28F 3/08 |
| 2020/0331073 A1 * | 10/2020 | Thiel | ........................ | B23C 3/13 |

* cited by examiner

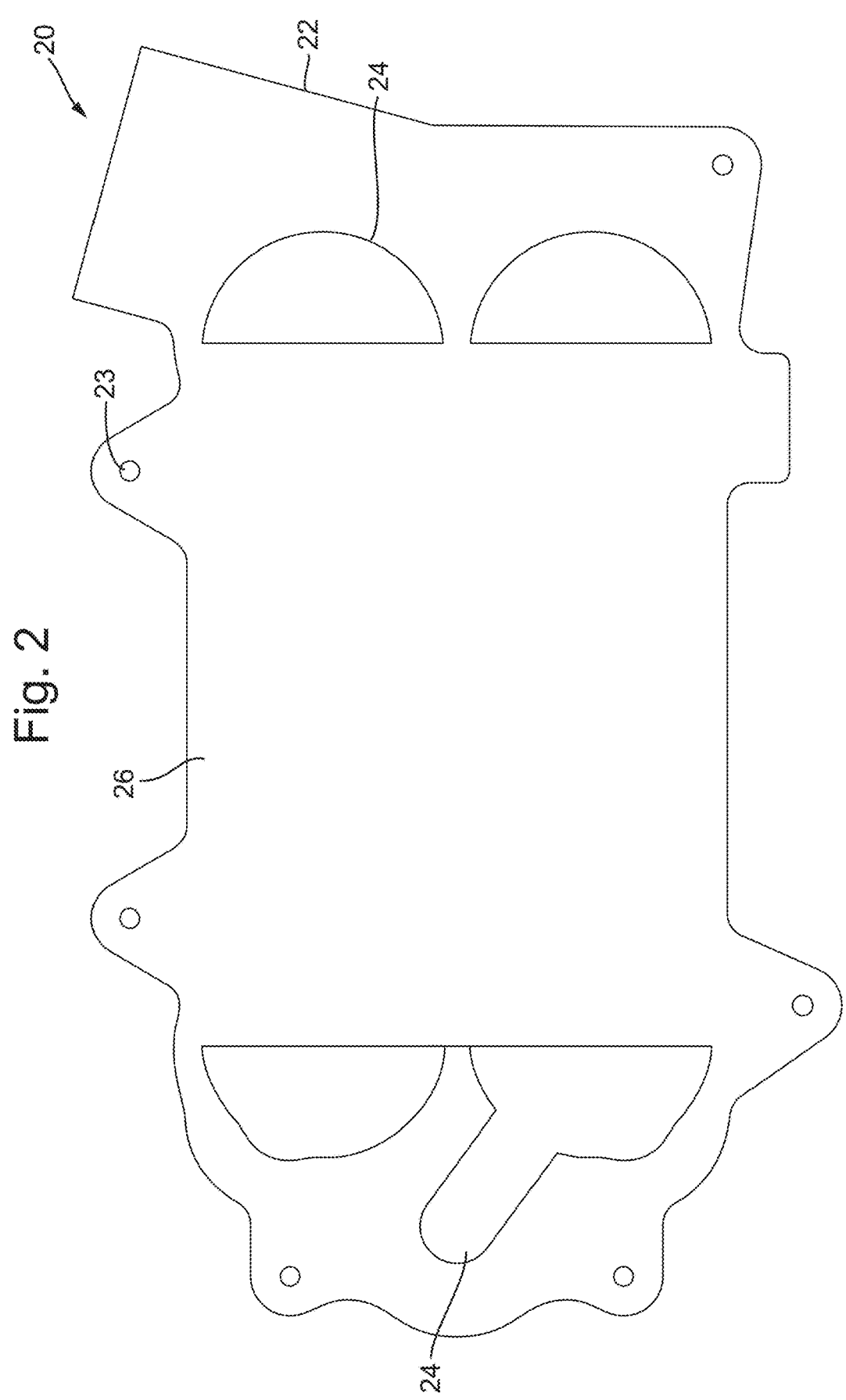

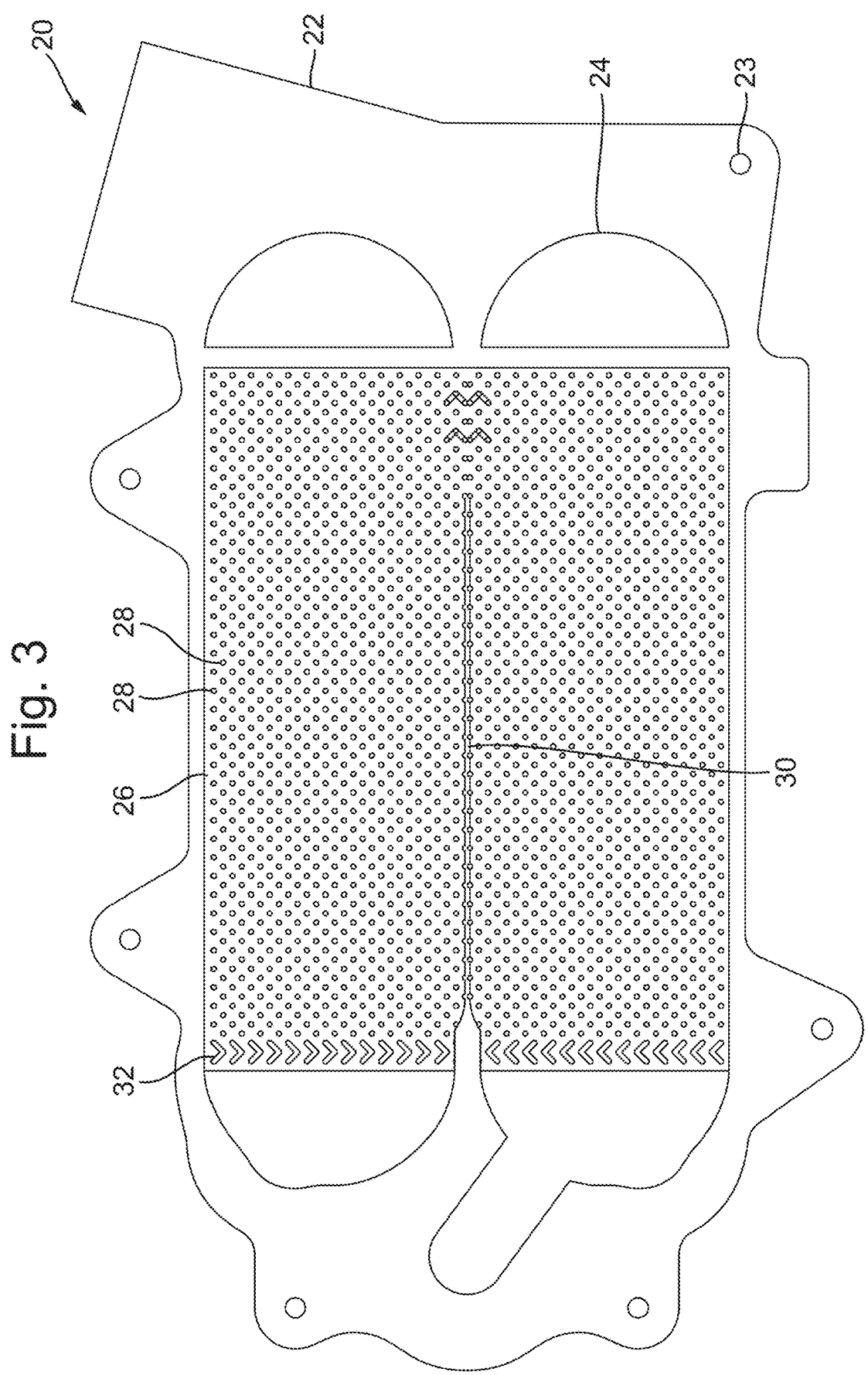

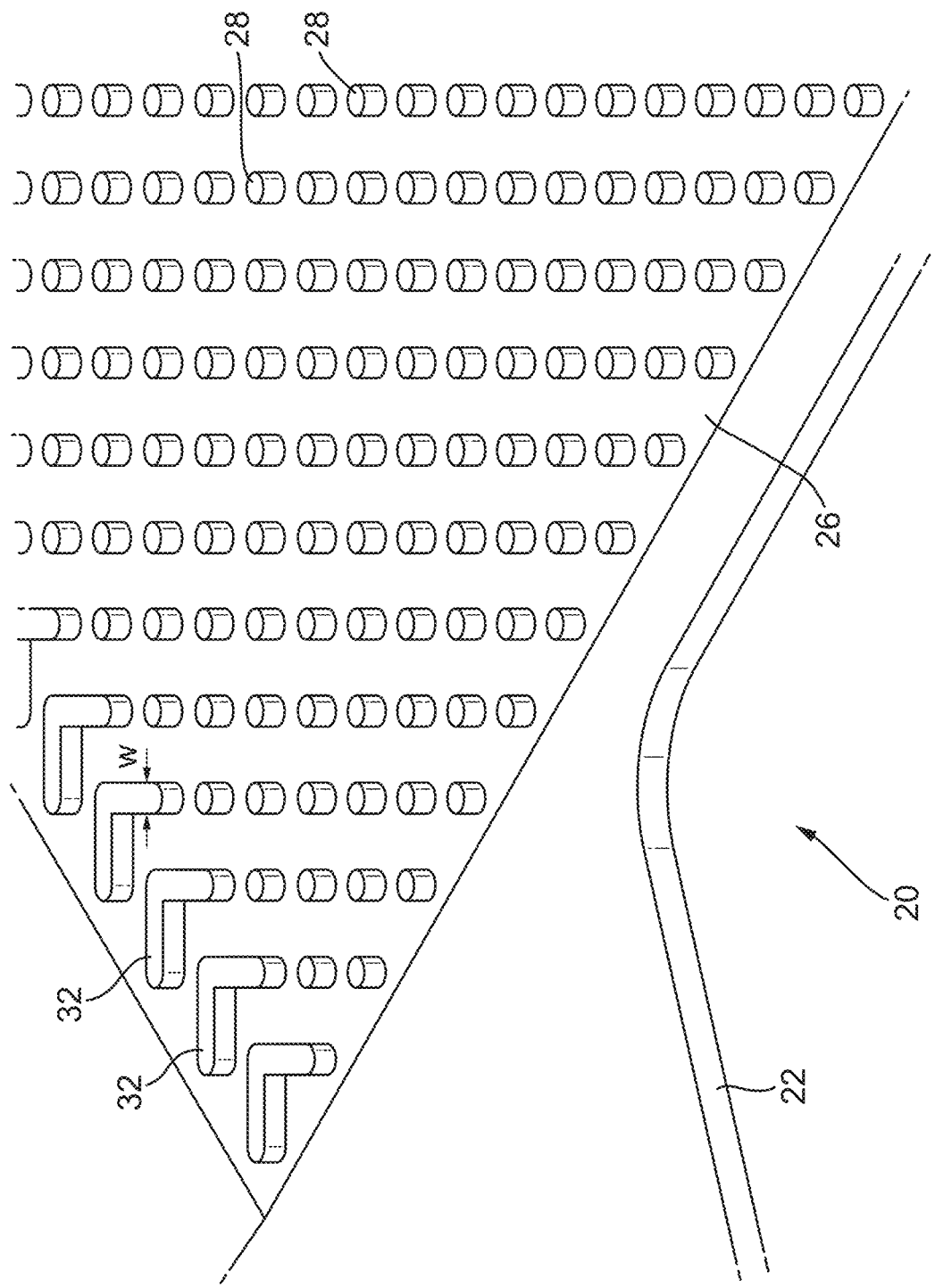

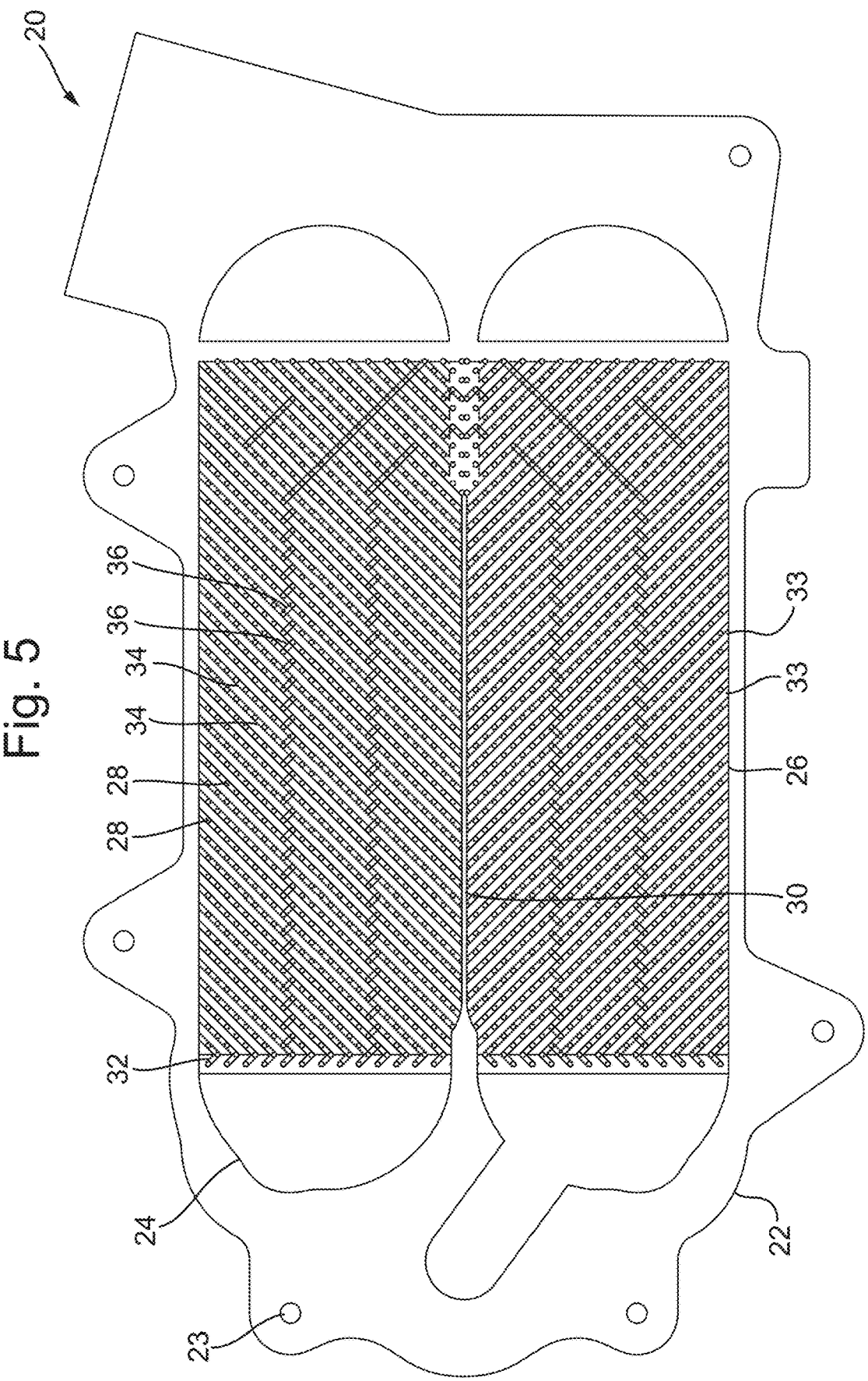

METHOD OF FORMING A COMPONENT FOR A HEAT EXCHANGER

FOREIGN PRIORITY

This application claims priority to European Patent Application No. 17177513.3 filed Jun. 22, 2017, the entire contents of which is incorporated herein by reference.

FIELD

The present disclosure relates generally to heat exchangers, and methods of forming components therefor.

BACKGROUND

Laminate heat exchangers typically comprise a plurality of stacked plates. A plurality of pins extend between adjacent plates, to separate the plates, and additionally to aid in the heat exchange between the fluids flowing through the heat exchanger and between the plates.

Currently laminated heat exchanger parts are manufactured via the chemical etching of the heat transfer surfaces to form geometric features such as the pins.

SUMMARY

The present disclosure provides a method of forming a component for a heat exchanger, the method comprising machining a portion of a metal sheet to form a plurality of protrusions, and forming apertures in the portion of the metal sheet so as to form a plurality of ribs defined by adjacent ones of the apertures, wherein at least one protrusion is located on each of said ribs.

The plurality of ribs defined by the apertures are formed from the material not removed from the metal sheet. Removing the material from the metal sheet may comprise using machining, laser cutting, water jet, stamping, or chemical etching.

The method may comprise machining the portion of the metal sheet to form the plurality of the protrusions prior to forming the apertures in the portion of the metal sheet so as to form the ribs.

The plurality of protrusions may include a plurality of pins. The plurality of pins may be cylindrical. The plurality of pins may all have the same dimensions, i.e. the same height, and cross sections. Each pin may have a uniform cross section through its height.

The plurality of protrusions may include protrusions having chevron, teardrop, linear, diamond, square, rectangular, oval, circular and/or airfoil cross sections. The protrusions having a circular cross section may also be referred to as pins.

The step of forming apertures may comprise removing material from or cutting the metal sheet only at locations where protrusions are not present such that no protrusions are removed when the apertures are formed, i.e. there are the same number of protrusions before and after the step of forming the apertures. Alternatively, removing material from or cutting the metal sheet only at locations where protrusions are not present may be such that any cuts do not extend through protrusions, i.e. the cuts extend around any protrusions which may then be removed.

The ribs may comprise less than 60%, less than 50%, less than 40%, less than 30%, or less than 20% of the surface area of the metal sheet.

The plurality of ribs may comprise at least 5, at least 10, at least 20, at least 30, at least 40, at least 50, at least 60, at least 70, at least 80, at least 90, or at least 100 ribs.

The ribs defined by the apertures formed in the metal sheet may have a regular geometric pattern. The plurality of ribs may include a plurality of main ribs. Each main rib may have a longitudinal axis, and each main rib longitudinal axis of at least some of the ribs may have the same angle (i.e. the longitudinal axes of the main ribs may be parallel). The plurality of ribs may also include a plurality of cross ribs. Each cross rib may have a longitudinal axis, and each cross rib longitudinal axis of at least some of the cross ribs may have the same angle (i.e. the longitudinal axes of the cross ribs may be parallel). The cross rib longitudinal axes may be perpendicular to the main rib longitudinal axes.

The step of machining the portion of a metal sheet to form a plurality of protrusions may comprise mechanically removing material from the metal sheet such that the plurality of protrusions remain. This may be achieved by machining, such as by milling or grinding.

The plurality of protrusions may be formed in a regular geometric pattern. Alternatively, the plurality of protrusions may be formed in any suitable pattern.

The component may be a heat exchanger plate for a laminate heat exchanger.

The method may comprising cutting the metal sheet to have an outer profile and an inner profile suitable for use in a heat exchanger and prior to said step of machining the portion of the metal sheet.

The present disclosure also provides a method of forming a laminate heat exchanger comprising stacking together a plurality of heat exchanger plates, wherein at least one of said plates is the component formed according to the above described method, and arranging the protrusions on said at least one plate to be between adjacent heat exchanger plates.

The present disclosure also provides a metal plate for a laminate heat exchanger comprising a plurality of apertures, a plurality of ribs defined by adjacent ones of the apertures, and at least one protrusion located on each of said ribs.

The plate may be the component formed as discussed above.

The present disclosure also provides a laminate heat exchanger comprising a plurality of stacked heat exchanger plates, wherein at least one of the said plates is the above discussed metal plate, and wherein the protrusions of said at least one plate are arranged to be between adjacent heat exchanger plates.

BRIEF DESCRIPTION OF DRAWINGS

Various embodiments will now be described, by way of example only, and with reference to the accompanying drawings in which:

FIG. 2 shows a metal sheet for use in forming a heat exchanger plate according to an embodiment of the present disclosure;

FIG. 3 shows a partially formed heat exchanger plate according to an embodiment of the present disclosure;

FIG. 4 shows a close up perspective view of a section of FIG. 3; and

FIG. 5 shows a heat exchanger plate according to an embodiment of the present disclosure.

DETAILED DESCRIPTION

Figure 1:
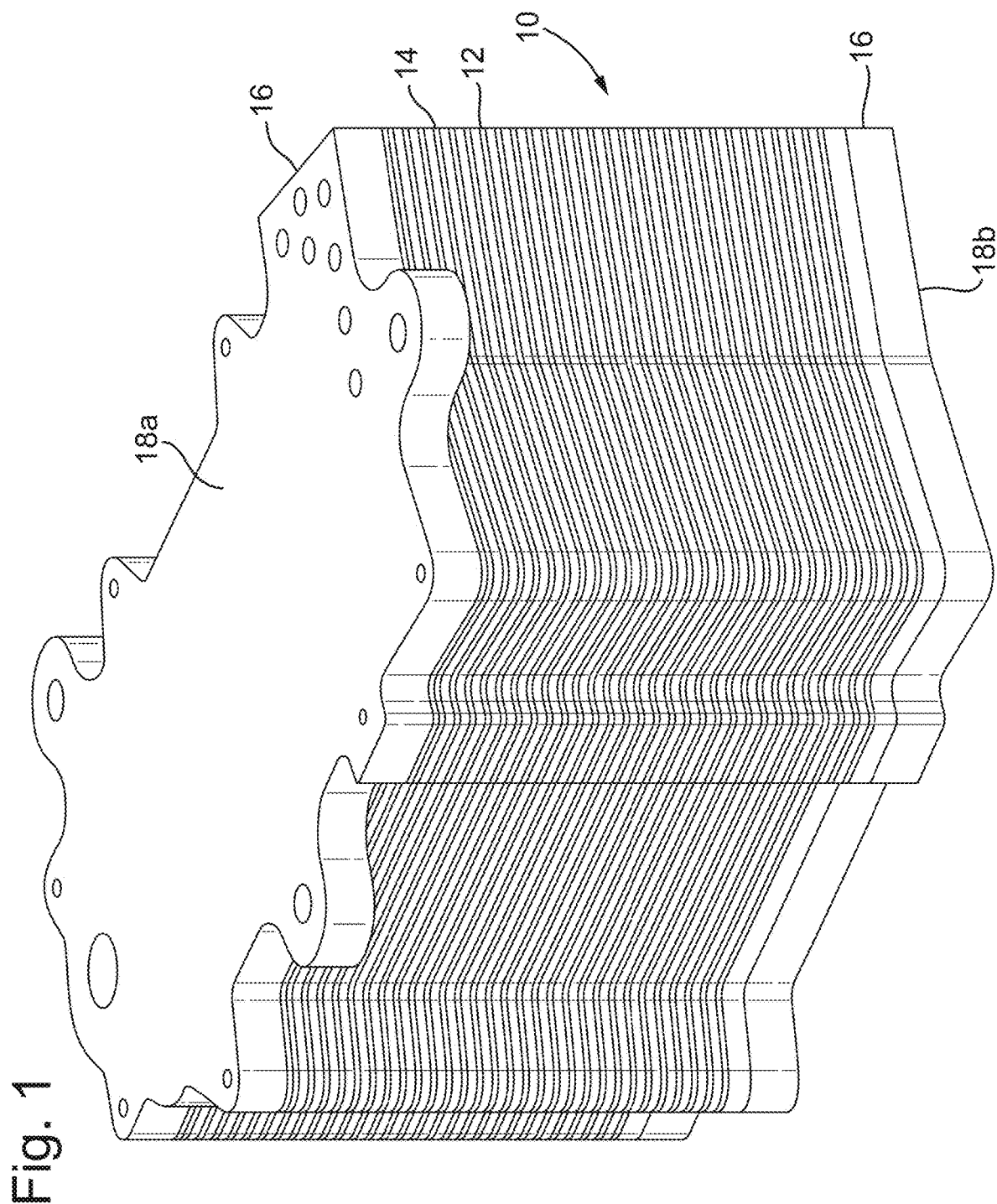
FIG. 1 shows an example of a laminate heat exchanger.

In various laminate heat exchangers according to the present disclosure, some of the plates may be substantially solid within the area where heat is exchanged, whilst some of the plates are ribbed, with the apertures between the ribs allowing fluid to flow through these plates. This enables increased fluid flow, whilst still providing a high surface area for heat exchange. One or more ribbed plate may be located between solid plates.

FIG. 1 shows an example of a laminate heat exchanger 10 including a stack of heat exchange plates, including for example one of more solid plate 12 and one or more ribbed plate 14. Sideplates 16 are located at the top and bottom ends 18a, 18b of the stack. The outer profiles of the solid plates 12 and ribbed plates 14 may be substantially the same. Sideplates 16 may be formed to be thicker than the heat exchange plates 12, 14, and may have an outer profile that generally corresponds with that of the solid and ribbed plates 12, 14, or may include additional features, such as to aid in attaching the heat exchanger to other components of the system in which it is arranged. Alternatively, the outer profiles may vary between the ends 18a, 18b of the heat exchanger.

Typically, each of the heat exchanger plates will be formed from a heat conductive material such as a metal sheet. Firstly, the metal sheet will be cut to the outer profile of the heat exchanger packaging, and to have an inner profile shaped to accommodate the fluid tanks to be arranged in the heat exchanger, and to include any ports required. This may be performed using techniques such as water jet machining, or laser cutting. FIG. 2 shows such a metal sheet 20, which has been pre-cut using any suitable method, such as by stamping or by using water jet machining (a non-abrasive technique), or laser cut machinery, to be formed into a ribbed plate 14 for use in the heat exchanger of FIG. 1. The pre-cut metal sheet 20 has been cut to an outer profile 22 of the heat exchanger packaging, and inner profile 24 of the fluid tanks and ports to be used in the heat exchanger. As can be seen from FIG. 1, in a stack of plates in a laminate heat exchanger, the outer profiles 22 of the sheets may be substantially the same. The inner profiles 24 may differ through the stack to accommodate the fluid tanks and ports as necessary. The inner profiles 24 may include additional features such as, for example, holes 23 to aid in attaching the metal plates together to form the laminate heat exchanger.

Machinery, such as rapid computer numeric control (CNC) machinery (e.g. with interchangeable tooling) may then be used to remove material from the surface of a portion 26 of the metal sheet to form the plate shown in FIG. 3. Other suitable machinery could be used. The material may be removed by grinding or milling away the metal. The portion 26 of the metal sheet is the area which will be used for heat exchange in a heat exchanger. In the illustrated example, this area is rectangular, but the portion may have any suitable shape. The material is removed to leave a plurality of protrusions upstanding from the base of the sheet, which may include pins 28 and chevrons 32 (i.e. formed from the material not removed).

As shown in FIG. 3, the pins 28 may be generally formed in a grid pattern (i.e. in a series of parallel rows) across the portion 26 of the metal sheet. In FIG. 3, the grid pattern is arranged at an approximately 45 degree angle to the edges of the rectangular portion 26 to form rows and columns angled at approximately 45 degree angles to the edges of the rectangular portion 26. Alternatively, the protrusions could be formed at different angles or in a different geometric pattern, or in any other suitable pattern. In FIG. 3, the grid pattern is disrupted by a central strut 30 extending across the portion 26 of the metal plate 20, parallel to two edges of the portion 26. As shown in FIG. 3, the machining has also formed a plurality of chevron protrusions 32 arranged in lines either side of and perpendicular to the central strut 30 along one edge of the portion 26 of the metal sheet. The plurality of chevron protrusions 32 can provide additional strength to the metal sheet, which can be necessary due to the stress that the structure may be placed under when the metal sheet is part of a laminate heat exchanger, including pressure containment and vibrations.

FIG. 4 shows a close up perspective view of a section of FIG. 3. As can be seen, in some embodiments the pins 28 are cylindrical (i.e. have a uniform circular cross section), and are all of a uniform height. As shown in FIG. 4, the metal sheet may also include chevron-shaped protrusions 32 that may have a uniform, chevron shaped cross section, and may be the same height as the pins. The width W of each chevron protrusions 32 may be the same as the diameter of each pin 28. The end of each chevron protrusion 32 proximate the plurality of pins 28 may align with a row of the plurality of pins 28 in the grid pattern, the row extending to the edge of the rectangular portion 26. In other embodiments, the protrusions 28, 32 may have any other suitable shaped cross section, such as teardrop, diamond, rectangular, or oval. The cross sectional shapes may be uniform. The protrusions may all have the same height.

After the protrusions have been formed, apertures are formed in the portion 26 of the metal sheet, for example by using a technique such as machining, laser cutting, stamping, water jet cutting, or chemical etching. In the arrangement of FIG. 5, the apertures 33 have been formed in areas of the portion 26 of the metal sheet that did not previously include protrusions 28, 30 (i.e. no protrusions or portions of protrusions are removed when the apertures are formed). Alternatively, forming the apertures 33 may include removing areas of the portion 26 of the metal sheet upon which protrusions or portions of protrusions are formed. In this technique, each aperture 33 may be formed by machining, cutting, stamping, or etching only through the metal sheet at locations that do not have protrusions. The aperture 33 can therefore be formed without machining, cutting, stamping, or etching through protrusions 28, 30.

As can be seen in FIG. 5, the apertures 33 define a pattern of ribs. The pattern of ribs may include primary ribs 34 and cross ribs 36. As shown in FIG. 5, the width of the apertures 32 may be substantially wider than the primary ribs 34 defined therebetween. The apertures 34 may be arranged at the same angle to the edge of the portion 26 of the metal plate as the rows of pins 28 such that the apertures 33 extend between and in line with the rows of pins 28, and the rows of pins 28 are formed on the primary ribs 34. As in the illustrated embodiment, this may allow the apertures to be formed in areas not including protrusions. Cross-ribs 36 may extend between primary ribs 34 to provide additional structural support. The cross ribs 36 may align with other cross ribs. In the illustrated embodiment, the ends of the primary ribs 34 proximate the chevron protrusions 32 align with said chevron protrusions 32 such that one end of each chevron protrusion 32 is located on a primary rib 34. The pattern of the primary ribs 34 may be reversed on opposite sides of the central strut 30 (i.e. symmetrical with respect to the strut), such that the primary ribs 34 on each side are perpendicular to one another.

In use, the ribbed plates 14 formed by the method of the present disclosure, and illustrated in FIG. 5, are stacked, optionally along with non-ribbed plates 12, which may be formed to have protrusions by a similar method, such as illustrated in FIG. 4. There may be any number of ribbed plates 14 between ones of solid plates 12, such as one ribbed plate 14, two ribbed plates, three ribbed plates, or four or more ribbed plates. Ribbed plates 14 located between solid plates 12 increases the volume of fluid which can pass through the channel formed by the solid plates 14 whilst maintaining a high area for heat transfer between the fluid and the plates 12, 14.

A heat exchanger generally uses two fluids having different temperatures. Each pair of adjacent solid plates 14 forms a channel (which may include one or more ribbed plates therebetween). The relatively hot and cold fluids are flowed through adjacent channels, often in opposite directions (i.e. a solid plate 14 will have a hot fluid in a channel on one side thereof, and cold fluid in a channel the other side thereof). The heat is exchanged between the fluids in the channels via the heat exchange plates 12, 14. Heat transfers from the hot fluid to the ribbed and solid plates 14, 12 located in the channel that the hot fluid passes through. Heat then transfers from the ribbed plate(s) 14 to the solid plates 12 through the adjacent channel(s) via the protrusions (e.g. pins) located therebetween. The heat can then transfer to the cold fluid passing via the solid plate(s) 12. Heat may also be transferred from the solid plate(s) 12 to a ribbed plate(s) 14 in the channel through which the cold fluid is flowing via the protrusions (e.g. pins) located therebetween. The heat may pass from this ribbed plate(s) to the cold fluid. The cold fluid then leaves the laminate heat exchanger so as to remove the heat from the system, which the "hot" fluid leaves the system in a cooled state. Ports at either end of the channels allow the channels containing the same fluid to be linked.

Alternatively, the hot fluid may flow through all of the channels, and the plates (both ribbed and solid) may be cooled and the ends thereof, for example by using liquid nitrogen. Heat would then exchange from the hot fluid to the cooled plates.

The invention claimed is:

1. A method of forming a component for a heat exchanger, the method comprising
    grinding a portion of a metal sheet to form a plurality of protrusions; and then
    forming elongate apertures in the portion of the metal sheet so as to form a plurality of elongate ribs defined between adjacent ones of the apertures;
    wherein at least one protrusion is located on each of said elongate ribs;
    wherein the plurality of protrusions include a plurality of pins.

2. The method of claim 1, wherein the plurality of protrusions include protrusions having at least one of: chevron, teardrop, linear, diamond, oval, circular or airfoil cross sections.

3. The method of claim 1, wherein the step of forming apertures comprises cutting the metal sheet at locations where protrusions are not present.

4. The method of claim 1, wherein the plurality of ribs comprises at least 10 ribs.

5. The method of claim 1, wherein the ribs defined by the apertures formed in the metal sheet have a regular geometric pattern.

6. The method of claim 1, wherein the plurality of protrusions are formed in a regular geometric pattern.

7. The method of claim 1, wherein the component is a heat exchanger plate for a laminate heat exchanger.

8. The method of claim 1, comprising cutting the metal sheet to have an outer profile and an inner profile suitable for use in a heat exchanger and prior to said step of grinding the portion of the metal sheet.

9. The method of claim 1, wherein said grinding a portion of a metal sheet to form a plurality of protrusions comprises removing material from a surface of the portion to leave the plurality of protrusions upstanding.

10. The method of claim 1, wherein the plurality of ribs comprises at least 20 ribs.

11. The method of claim 1, wherein each elongate rib is defined between two adjacent elongate apertures so that the rib has elongate side edges defined by the adjacent apertures.

12. The method of claim 1, wherein a plurality of the protrusions are located along opposing elongated sides of each elongate aperture.

13. A method of forming a component for a heat exchanger, the method comprising
    grinding a portion of a metal sheet to form a plurality of protrusions; and then
    forming elongate apertures in the portion of the metal sheet so as to form a plurality of elongate ribs defined by adjacent ones of the elongate apertures;
    wherein at least one protrusion is located on each of said elongate ribs.

* * * * *